(12) United States Patent
Schook

(10) Patent No.: US 8,991,622 B2
(45) Date of Patent: Mar. 31, 2015

(54) SEPARATING DEVICE AND METHOD WITH A RETURN FLOW OF HEAVY FRACTION

(75) Inventor: Robert Schook, Steenderen (NL)

(73) Assignee: Advanced Technologies & Innovations B. V., Arnhem (NL)

( * ) Notice: Subject to any disclaimer, the term of this patent is extended or adjusted under 35 U.S.C. 154(b) by 750 days.

(21) Appl. No.: 13/319,741

(22) PCT Filed: May 12, 2010

(86) PCT No.: PCT/NL2010/050273
§ 371 (c)(1),
(2), (4) Date: Jan. 19, 2012

(87) PCT Pub. No.: WO2010/131958
PCT Pub. Date: Nov. 18, 2010

(65) Prior Publication Data
US 2012/0103423 A1    May 3, 2012

(30) Foreign Application Priority Data
May 12, 2009   (NL) ...................................... 2002875

(51) Int. Cl.
*B04C 3/00* (2006.01)
*B04C 3/06* (2006.01)
*B01D 45/16* (2006.01)

(52) U.S. Cl.
CPC . *B04C 3/06* (2013.01); *B01D 45/16* (2013.01); *B04C 3/00* (2013.01)
USPC ...................................................... 210/512.3

(58) Field of Classification Search
CPC ............. B04C 3/00; B04C 3/06; B01D 45/16
USPC ............ 210/512.3; 96/188, 216, 301; 55/340, 55/392, 394, 452, 456, 457
See application file for complete search history.

(56) References Cited

U.S. PATENT DOCUMENTS

| 7,163,626 B1 | 1/2007 | Cuypers et al. |
| 2003/0115843 A1 | 6/2003 | Haland |
| 2005/0000200 A1 | 1/2005 | Christiansen et al. |

*Primary Examiner* — David A Reifsnyder
(74) *Attorney, Agent, or Firm* — The Webb Law Firm

(57) ABSTRACT

The invention relates to a device for separating a heavy fraction from a fluid, comprising: a main channel; swirl means in the main channel; collecting means adjoining the main channel for collecting the discharge heavy fraction; a concentric additional supply conduit with an outlet and extending into the cylindrical housing; a return channel connecting the collecting means with the additional supply conduit, and deflection means wherein the outlet is encircling the circumference of the additional supply conduit. The invention also relates to a method for separating a heavy fraction from a fluid using such a device.

24 Claims, 3 Drawing Sheets

SEPARATING DEVICE AND METHOD WITH A RETURN FLOW OF HEAVY FRACTION

BACKGROUND OF THE INVENTION

1. Field of the Invention

Figure 1:
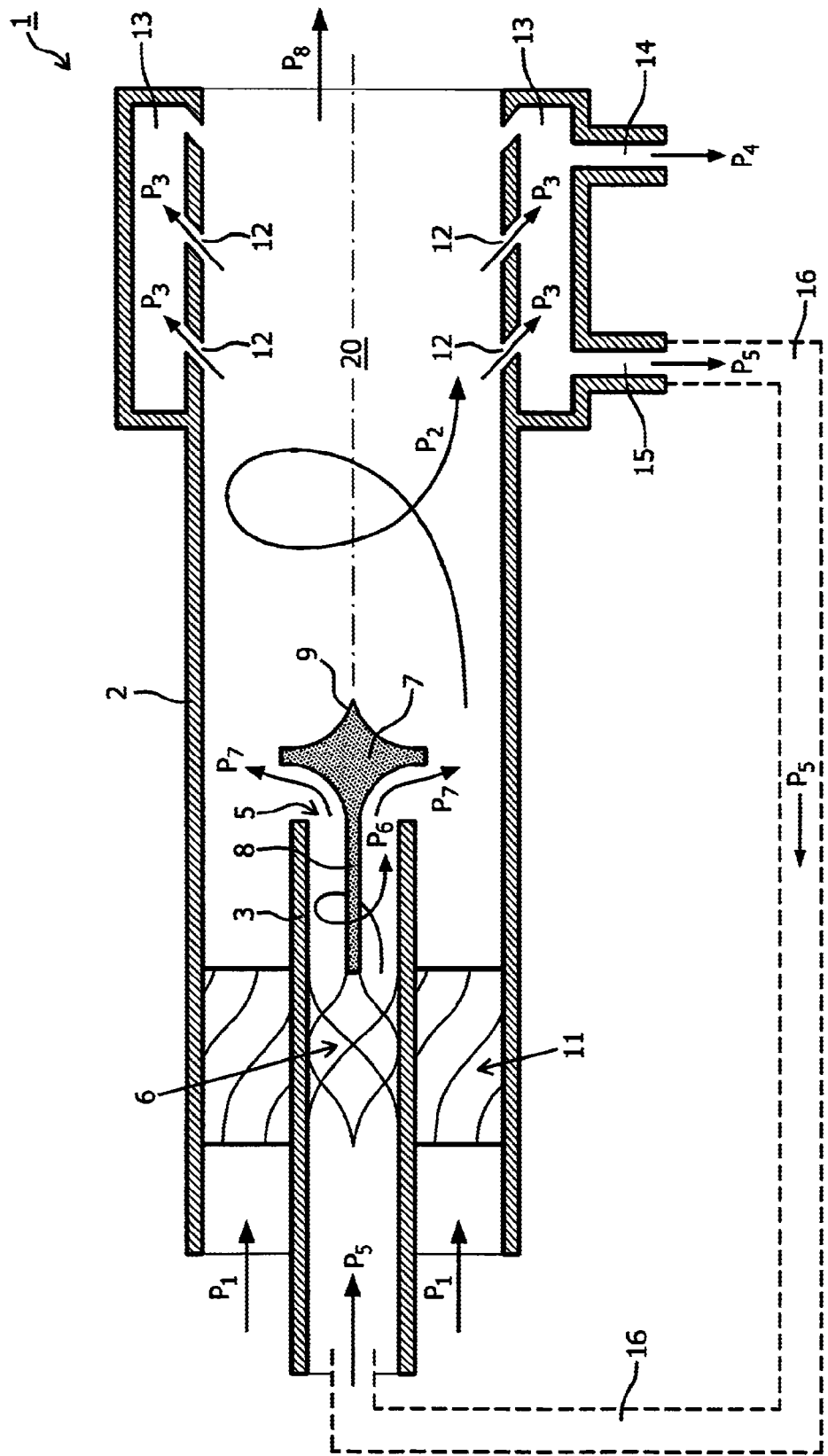

The invention relates to a device for separating a heavy fraction from a fluid, comprising: a main channel, surrounded by a substantially cylindrical housing; swirl means, positioned in the main channel, for transferring a rotating movement component to the fluid moving through the main channel; collecting means, which in radially direction to openings in the cylindrical housing adjoin to the main channel, for collecting the discharged heavy fraction; a concentric additional supply conduit, provided with an outlet, which additional supply conduit at least partly extends into the cylindrical housing; a return channel, which connects the collecting means with the additional supply conduit; and the additional supply conduit is provided with deflection means, which are positioned downstream of the outlet, for providing a movement component in radial direction to the returning fluid fraction moving through the return channel. The invention also relates to a method for separating a heavy fraction from a fluid, comprising the steps: A) supplying the fluid through a main channel and providing the fluid with a rotational movement component; B) discharging a heavy fraction of the fluid through openings in the wall of the main channel; and C) returning at least a part of the heavy fraction as discharged during step B) via a return channel to an additional supply conduit which is coaxially positioned in the main channel.

2. Description of the Prior Art

The U.S. Pat. No. 7,163,626 discloses a device for treating a gas/liquid mixture, also referred to as a "demister", provided with: an inlet, an outlet, rotating means arranged in a tube between the inlet and the outlet to realise a separating cyclone, one or more outlet openings in the tube downstream the rotating means to allow a part of the mixture to flow laterally out of the tube, a return conduit arranged in axial direction through the rotating means for reintroducing in the tube the flow which has exited via the outlet openings and divergence means arranged close to the outlet opening of the return conduit for allowing the reintroduced flow to diverge laterally. The advantage of the return conduit in the separating device debouching at a location axially in the tube is that it enables a lighter component present in the heavier fraction discharged to the tube to a renewed separating process. The divergence means arranged close to the outlet opening of the return conduit cooperate with the outlet opening of the return conduit that is usually arranged in the centre of the tube. As the mixture has a substantially axial speed component in the centre of the tube (the centre of the cyclone) creep may occur along the return conduit whereby liquid droplets are introduced in the (centre of) the outlet flow. To enhance the capacity of the separating device (e.g. to enable working a increased pressure and/or with increased flow quantities) in U.S. Pat. No. 7,163,626 divergence means are introduced for allowing the reintroduced flow to diverge laterally and for allowing creep that occur along the return conduit to diverge laterally.

SUMMARY OF THE INVENTION

The object of the invention is to provide a device for separating a heavy fraction from a fluid which, while retaining the advantages of the prior art, provides for even better separation properties and less creep in the outlet flow.

The invention provides for this purpose a device for separating a flowing medium comprising mixture wherein an outlet of an additional supply conduit is encircling the circumference of the additional supply conduit. With "encircling" is meant that the girth of the additional supply conduit (normally a tube or pipe) is completely surrounded by the outlet of the additional supply conduit. The advantage of the specific design of the outlet of the additional supply conduit according the present invention is that it shuts the door for creep of liquid droplets along the return conduit reaching to the deflection means. Before the liquid droplets reach the deflection means they always find the outlet on their way as long as their way is longitudinal with the main channel. When reaching the boundary of the outlet the creep (droplets) will blown off (away from the return conduit) so merging with the liquid flow in the main channel. In case the droplets are not blown off far from the return conduit they can be transported further in radial direction of the main channel by the deflection means. As the outlet encircles the circumference of the additional supply conduit no creek to the deflection means appears and thus no change that such creep to the deflection means results in liquid droplets leaving the deflection means such that these droplets are introduced in the (centre of) the outlet flow. The outlet flow will thus contain less liquid particles and the quality of separation has improved. The outlet of the additional supply conduit may extend perpendicular to the axial direction of the main channel, may only locally extend perpendicular to the axial direction of the main channel or may have another orientation to the axial direction of the main channel.

It is additionally noted that the separation of the fractions is understood to mean at least partial separation of two fractions such that a significant difference results in the average mass density of the two fractions; a complete (100%) separation will be difficult or impossible to realize. Especially when used as a demister a substantial part of liquid particles (droplets, "mist particles") can be withdrawn from a gas flow such that the demisted gas flow is cleaned of at least 90%, or even better at least 95 to 98%, of the content of liquid particles in the liquid mixture before processing. This increases the efficiency of the further processing of especially the gas fraction but also that of the liquid fraction. However after separation the ("cleaned") fractions may still contain a part of another fraction, but the presence of this other fraction (especially in the gas fraction in the situation of demisting) is significantly smaller than when processed with the prior art separation devices.

In a preferred embodiment the outlet of the additional supply conduit comprises plural apertures that collectively encircle the circumference of the additional supply conduit. Such plural apertures may in flow direction through the main channel lie at different heights and preferably overlap each other partially to even further limit the chances of creep to reach the deflection means. However an alternative is a single aperture that simply circular passes around the additional supply conduit or as a helix encircles the circumference of the additional supply conduit, in which situation at least a part of the outlet of the additional supply conduit has a helical shape. Both embodiments will be further elucidated in the attached figures.

In a structurally attractive embodiment the deflection means comprise a deflection body, positioned coaxial with the additional supply conduit and downstream of the outlet. For deflection of all droplets leaving the boundaries of the outlet of the additional supply conduit (the single or plural apertures) it is preferred that the projection of the outlet encircling/surrounding the additional supply conduit on a plane perpendicular to the main channel is lying within the projection of the deflection means on the same plane perpendicular to the main channel. As in such situation the deflection means are larger than the outlet (the largest diameter of the deflection body is larger than the diameter of the additional supply conduit) no droplets leaving the outlet in coaxial direction with the main channel can pass the deflection means without being deflected.

As the additional supply normally has a circular cross section the deflection means are preferably substantially dish-shaped.

To mount the deflection to the foregoing part of the additional supply conduit means they may be connected by a pen, which pen extends in axial direction in the foregoing part of the additional supply conduit, so providing the freedom to make use of a single encircling outlet. In case of the diameter of such pen with decreasing distance to the deflection means having an increasing diameter the pen is also use as a deflecting starting element; the fluid flow in the additional supply unit will start to be forced in radial direction (compared to the main channel) already by flowing along the pen.

Instead of a single concentric channel in the additional supply conduit such conduit may also comprise at least two separate non-concentric flow channels separated form each other by a partitioning wall that also may with decreasing distance to the deflection means having an increasing thickness (to look for a comparable effect with the compare with the pen with increasing diameter see above).

To further limit the chance that droplets leave the deflection means at a central location in the main channel (e.g. droplets due to creep that has developed on the deflection means) the deflection means may be provided with a projection at its side away from the additional supply conduit. For a smooth change of flow direction of the heavy phase in the additional supply conduit to a flow direction when entering the main channel having at least a radial component the deflection means may be embodied as a conical structure with a decreasing diameter towards the outlet.

To catch the heavy fraction leaving the openings in the cylindrical housing of the main channel these openings in the cylindrical housing are connection to one or more collection spaces. As to enable efficient drainage of the heavy fraction from the main channel the openings in the cylindrical housing of the collection means may be elongated and extend in a direction perpendicular to the direction of the swirl-means in the main channel. To further stimulate the efficient drainage of the heavy fraction from the main channel the openings in the cylindrical housing of the collection means may at least partly surrounded by an opening edge, which opening edge extends into the cylindrical and/or the cylindrical housing may be provided with helical extending curvatures, which helically extending curvatures may have a rotational direction that are substantially perpendicular to the longitudinal direction of the openings.

As to further enhance the efficiency of separation also the deflection means may be provided with a rotational component to the part of the returning fluid fraction that contacts the deflection means. The reintroduced heavy fraction will so be introduced that is supports the separation cyclone in the main channel. In a further embodiment the deflection means comprise a spray-nozzle, in particular a hollow-cone nozzle and/or the cylindrical housing of the main channel is conically tapered in flow-direction, also for further enhancing the separation efficiency in main channel.

The present invention also provides a composition of a device as disclosed above and means for forcing the fluid through the device. The device can additionally be provided with means, for instance a pump, for causing the fluid for separating into fractions to flow in axial direction through the main tube.

The present invention moreover provides a method for separating a heavy fraction from a fluid, wherein the heavy fraction of the fluid as returned during step C) is expelled by an outlet that encircles the additional supply conduit channel and subsequently at least part of the expelled heavy fraction of the fluid is deflected towards the exterior of the mains channel For the advantages of applying this method reference is made to the above stated advantages of the device according to the present invention. Although it is possible in principle to separate fluid/fluid-, fluid/gas- and gas/gas-mixtures the method is especially favourable for separating a heavy fraction being substantially a fluid and a light fraction that is substantially a gas. Further efficiency improvement may result when the heavy fraction returned to the main channel by the return channel is provided with a rotational component.

As for continuation of the separation process in time at least a part of the heavy fraction will normally be removed (drained away) in which situation only a part of the heavy fraction of the fluid discharged through openings in the wall of the main channel during step B) is returned into the main channel by the return channel. The method as disclosed is easy to be performed in a device as disclosed before.

BRIEF DESCRIPTION OF THE DRAWINGS

The present invention will be further elucidated on the basis of the non-limitative exemplary embodiments shown in the following figures. Herein:

FIG. 1 is a side view of a separating device according to the present invention;

FIG. 2 is an partially exploded perspective view of an alternative embodiment of a separating device according to the present invention;

FIG. 3 is a perspective view of an alternative embodiment of the outlet of the additional supply conduit provided with deflection means compared to the representation of this part as shown in FIG. 2;

FIG. 4 is a perspective view of an alternative embodiment of the cylindrical housing of the main channel provided with openings for discharge of the heavy fraction compared to the representation of this part as shown in FIG. 2;

FIG. 5 is a perspective view of a second alternative embodiment of the outlet of the additional supply conduit provided with deflection means.

DETAILED DESCRIPTION OF THE PREFERRED EMBODIMENTS

FIG. 1 shows a separating device 1 with a main channel 20 surrounded by a cylindrical housing 2. Concentric to the main channel 20 an additional supply conduit 3 extends into the cylindrical housing 2. The additional supply conduit 3 is provided with an outlet 5 that encircles (surrounds) the circumference of the additional supply conduit 3. In the additional supply conduit 3 swirl means 6 are located, e.g. made out of helical blades. Downstream the outlet 5 of the additional supply conduit 3 and coaxial with the additional supply conduit 3 (and thus also coaxial with the main channel 20) a substantially dish-shaped deflection body 7 is located. The deflection body 7 is connected with a coaxial pen 8 to the swirl means 6, which pen 8 has an increasing diameter with decreasing distance to the deflection body 7. The deflection body 7 is at its side away from the additional supply conduit 3 provided with a projecting part 9 that is, among others, provided to prevent turbulent flow downstream of the deflection body 7. The additional supply conduit 3 is attached coaxial in the main channel 20 using swirl means 11, here also made out of helical blades. These swirl means 11 are, as will be explained later, not only provided for securing the additional supply conduit 3 in the main channel 20 but mainly for rotating the fluid to be separated in the main channel 20.

Downstream of the deflection body 7 connected to the additional supply conduit 3 in the cylindrical housing 2 of the main channel 20 openings 12 are provided to let a heavy separated fraction to radially leave the main channel 20. These openings 12 are surrounded by a collection space 13 is located, which collection space 13 is provided with a first outlet 14 to remove a part of the heavy fluid fraction and a second outlet 15. The second outlet 15 of the collection space 13 connects via a—here schematically represented—return channel 16 to the additional supply conduit 3.

Now for the operating of the separating device 1 as shown in FIG. 1 a fluid to be separated is fed to the main channel 20 according arrows $P_1$ and provided with a rotational movement component due to the passing of the swirl means 11 leading to a fluid cyclone in the main channel 20 as represented by arrow $P_2$. Due to the fluid cyclone in the main channel 20 a heavy fraction of the fluid will be discharged through the openings 12 in the cylindrical housing 2 as represented by arrows $P_3$. A part of the heavy fraction collected in space 13 leaves the separating device 1 via the first outlet 14; see arrow $P_4$, and the further part of the heavy fraction collected in space 13 is returned in the separation process via the second outlet 15 and subsequently the return channel 16 into the additional supply conduit 3; see arrows $P_5$. The, as illustrated, returned heavy fluid fraction in the additional supply conduit 3 is provided with a rotational movement component due to the passing of the swirl means 6 (see arrow $P_6$) and is expelled by the outlet 5 and at least for a part subsequently deflected according arrows $P_7$ by the deflection body 7 towards the cylindrical housing 2 of the mains channel 20. The so returned fraction of fluid will combine with the fluid cyclone in the main channel 20 as already represented before by arrow $P_2$. Finally the lighter fluid fraction leaves the main channel 20 according arrow $P_8$. An important advantage of the separating device 1 is that any creep (e.g. condensation droplets) that may occur along the return conduit 3 will not flow to the deflection body 7 with the danger of being introduced in the (centre of) the outlet flow Pg but due to the outlet 5 of the additional supply conduit 3 encircling the circumference of the additional supply conduit 3 will be blown off the supply conduit 3 due to the fluid leaving the outlet 5 (arrow $P_7$). This leads to less droplets in the outlet flow $P_8$ and thus to a better separation result.

Figure 2:
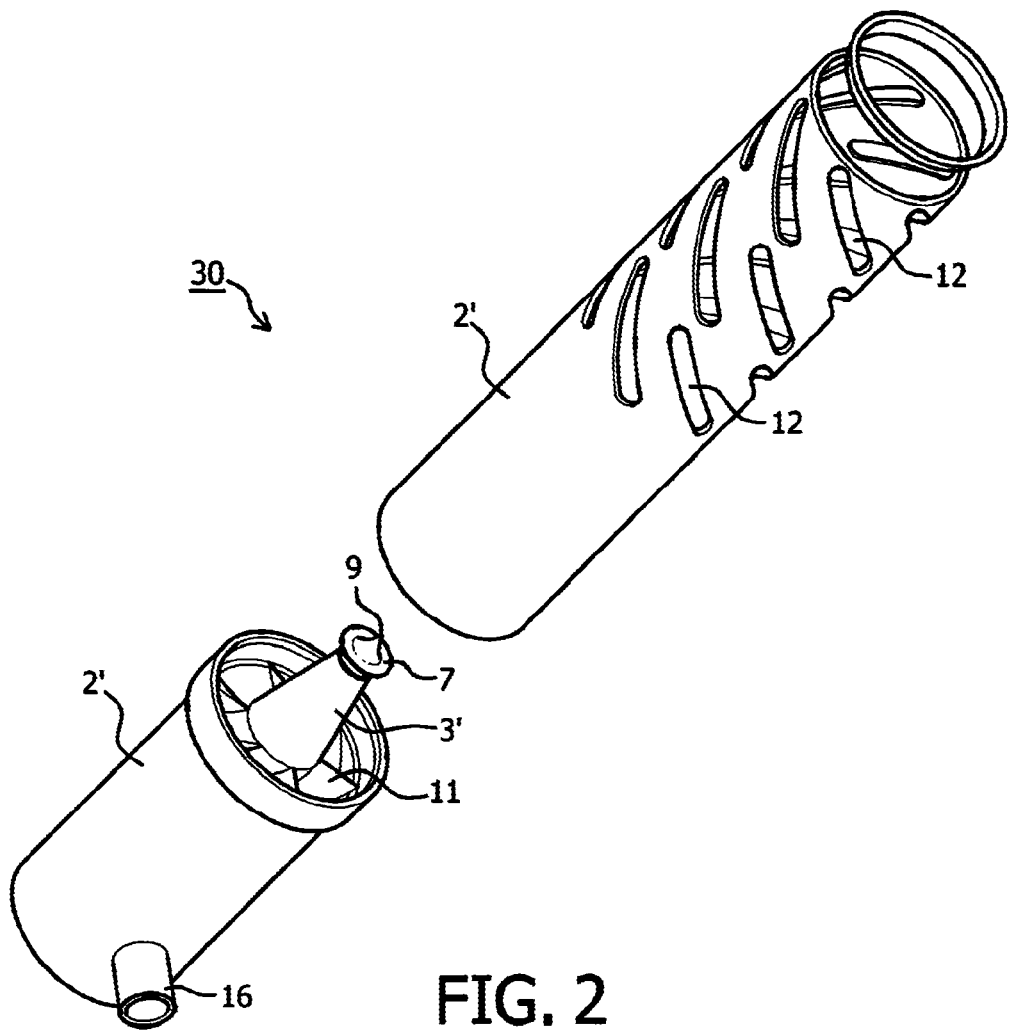

FIG. 2 shows an alternative embodiment of a separating device 30 according to the present invention wherein the same reference signs are used for similar components. The separation device 30 as shown here differs from the separation device 1 as depicted in FIG. 1 in that the cylindrical housing 2' of the main channel 20' here is conically tapered in flow-direction. The FIG. 2 also represents that the helical openings 12 in the cylindrical housing 2 are elongated and extend in a direction perpendicular to the direction of the swirl means 11 (the direction of the blades) in the main channel 20. Furthermore is visible that the cylindrical housing 2' of the main channel 20' is composed of two detachable parts and that the downstream part of the additional supply conduit 3' is conically tapered in flow-direction.

Figure 3:
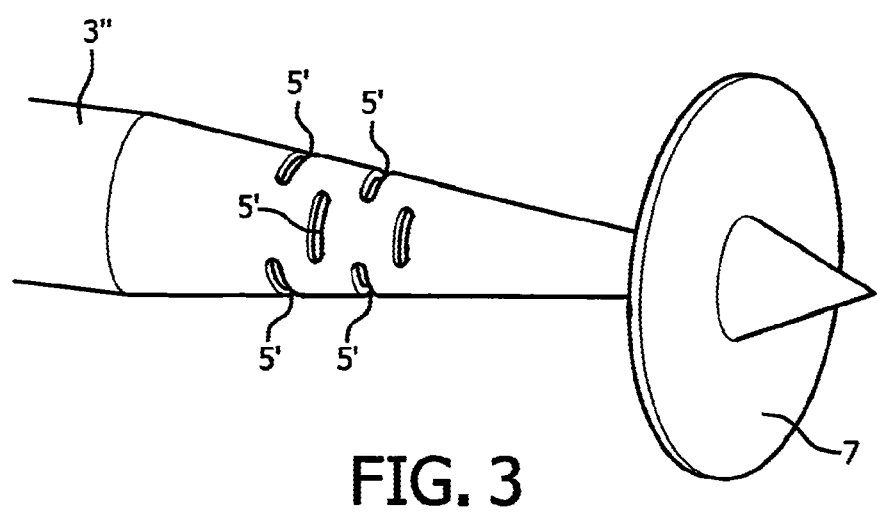

FIG. 3 shows an alternative embodiment of an outlet of the additional supply conduit 3" provided with a dish-shaped deflection body 7. Here the outlet comprises plural apertures 5' that collectively (as a combination) encircle the complete circumference of the additional supply conduit 3".

Figure 4:
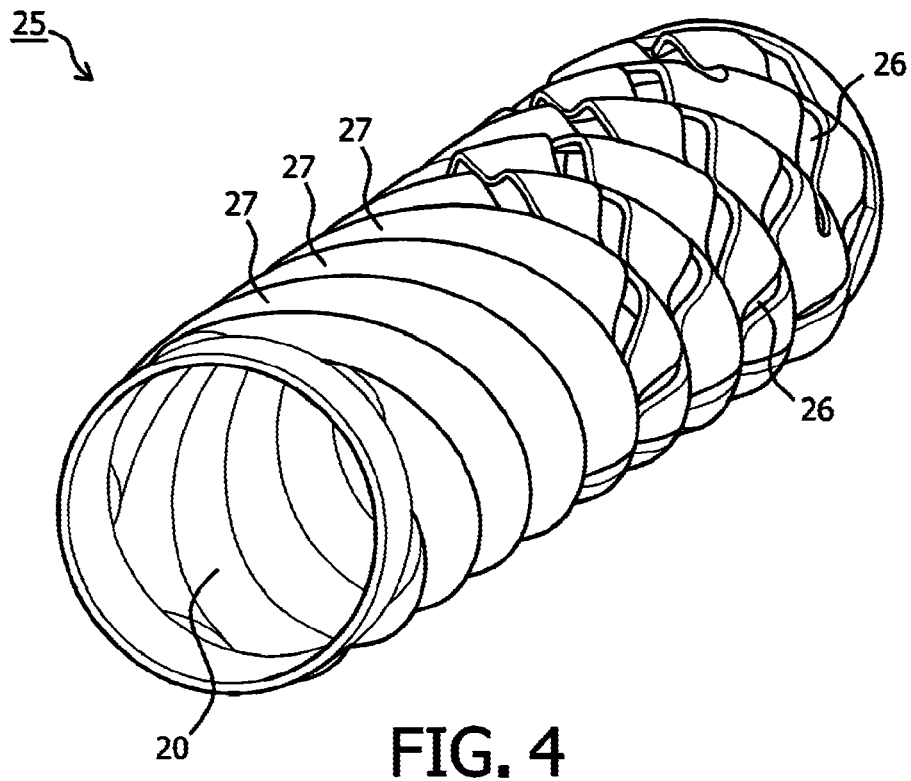
Figure 5:
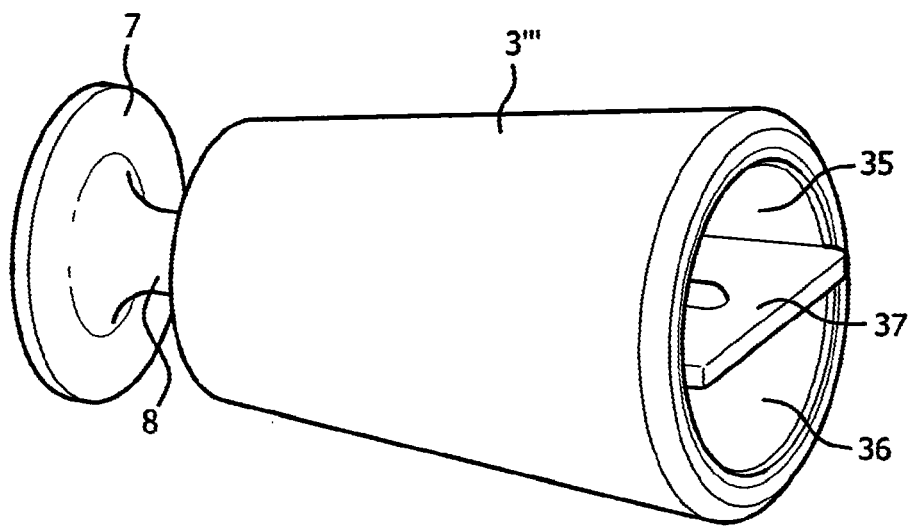

FIG. 4 shows an alternative embodiment of the cylindrical housing 25 of the main channel 20 provided with openings 25 for discharge of the heavy fraction. The cylindrical housing 25 is provided with helical extending curvatures 27 further supporting the cyclone in the cylindrical housing 25.

The perspective view of a second alternative embodiment of the downstream part of an additional supply conduit 3''' is showing two separate non-concentric flow channels 35, 36 that both lead to the deflection body 7 as shown before. The two separate non-concentric flow channels 35, 36 a separated by a partitioning wall 37 that carries the pen 8 supporting the deflection body 7.

The invention claimed is:

1. A device for separating a heavy fraction from a fluid, comprising:
   a substantially cylindrical housing defining a main channel;
   swirl means, positioned in the main channel, for transferring a rotating movement component to the fluid moving through the main channel, thereby separating a heavy fraction;
   collecting means for collecting the separated heavy fraction, which radially surround openings in the cylindrical housing that are provided to let the heavy separated fraction leave the main channel;
   an additional supply conduit concentric to the main channel, provided with an outlet, which additional supply conduit at least partly extends into the cylindrical housing; and
   wherein the additional supply conduit is adapted to receive separated heavy fraction from the collecting means;
   the additional supply conduit is provided with deflection means, which are positioned downstream of the outlet, the deflecting means causing a fluid exiting the outlet to move in a radial direction,
   wherein
   the outlet of the additional supply conduit is encircling the circumference of the additional supply conduit.

2. The device as claimed in claim 1, wherein the outlet of the additional supply conduit comprises plural apertures that collectively encircle the circumference of the additional supply conduit.

3. The device as claimed in claim 1, wherein at least a part of the outlet of the additional supply conduit has a helical shape.

4. The device as claimed in claim 1, wherein the deflection means comprise a deflection body, positioned coaxial with the additional supply conduit and downstream of the outlet.

5. The device as claimed in claim 1, wherein the projection of the outlet of the additional supply conduit on a plane perpendicular to the main channel is lying within the projection of the deflection means on the same plane perpendicular to the main channel.

6. The device as claimed in claim 1, wherein the largest diameter of the deflection body is larger than the diameter of the outlet of the additional supply conduit.

7. The device as claimed in claim 1, wherein the deflection means are substantially dish-shaped.

8. The device as claimed in claim 1, wherein the deflection means are connected by a shaft, which shaft extends in axial direction in the additional supply conduit.

9. The device as claimed in claim 8, wherein the diameter of the shaft with decreasing distance to the deflection means has an increasing diameter.

10. The device as claimed in claim 1, wherein the concentric additional supply conduit comprises at least two separate non-concentric flow channels.

11. The device as claimed in claim 1, wherein the deflection means are provided with a projection at its side away from the additional supply conduit.

12. The device as claimed in claim 1, wherein the deflection means are conical, with a decreasing diameter towards the outlet of the additional supply conduit.

13. The device as claimed in claim 1, wherein the collecting means comprises a collection space located around the openings in the cylindrical housing.

14. The device as claimed in claim 1, wherein the openings in the cylindrical housing are elongated and extend in a direction perpendicular to the direction of the swirl-means in the main channel.

15. The device as claimed in claim 1, wherein the openings in the cylindrical housing are at least partly surrounded by an opening edge, which opening edge extends into the cylindrical housing.

16. The device as claimed in claim 1, wherein the cylindrical housing is provided with helical extending curvatures.

17. The device as claimed in claim 16, wherein the rotational direction of the helically extending curvatures are substantially perpendicular to the longitudinal direction of the openings.

18. The device as claimed in claim 1, wherein the deflection means are shaped such that they provide a rotational component to a fluid that flows through the additional supply conduit and contacts the deflection means.

19. The device as claimed in claim 1, wherein the deflection means comprise a spray-nozzle.

20. The device as claimed in claim 1, wherein the cylindrical housing of the main channel is conically tapered in a direction of flow.

21. A method for separating a heavy fraction from a fluid, comprising the steps:
A) supplying the fluid through a cylindrical housing and providing the fluid with a rotational movement component, wherein the cylindrical housing defines a main channel;
B) discharging a heavy fraction of the fluid through openings in the cylindrical housing; and
C) returning at least a part of the heavy fraction as discharged during step B) via a return channel to an additional supply conduit which is coaxially positioned in the main channel;
wherein the heavy fraction of the fluid as returned during step C) is expelled by an outlet that encircles the additional supply conduit channel and subsequently the expelled heavy fraction of the fluid is deflected by a deflection means, positioned downstream of the outlet, towards the exterior of the cylindrical housing.

22. The method as claimed in claim 21, wherein the heavy fraction is substantially a fluid and in that a light fraction is substantially a gas.

23. The method as claimed in claim 21, wherein the heavy fraction returned to the main channel by the return channel is provided with a rotational component.

24. The method as claimed in claim 21, wherein only a part of the heavy fraction of the fluid discharged through openings in the wall of the main channel during step B) is returned into the main channel by the return channel.

* * * * *